(12) United States Patent
Negre et al.

(10) Patent No.: US 8,372,337 B2
(45) Date of Patent: Feb. 12, 2013

(54) METHOD AND DEVICE FOR DISINFECTING GROUNDS BY GENERATING HUMIDIFIED HOT COMPRESSED AIR

(75) Inventors: Guy Negre, Villeneuve Loubet (FR); Cyril Negre, Carros Cedex (FR)

(73) Assignee: Guy Negre, Villeneuve Loubet (FR)

( * ) Notice: Subject to any disclaimer, the term of this patent is extended or adjusted under 35 U.S.C. 154(b) by 837 days.

(21) Appl. No.: 12/305,837

(22) PCT Filed: Jun. 19, 2007

(86) PCT No.: PCT/FR2007/001013
§ 371 (c)(1),
(2), (4) Date: Dec. 19, 2008

(87) PCT Pub. No.: WO2007/147967
PCT Pub. Date: Dec. 27, 2007

(65) Prior Publication Data
US 2010/0008823 A1    Jan. 14, 2010

(30) Foreign Application Priority Data
Jun. 19, 2006   (FR) ...................................... 06 05413

(51) Int. Cl.
*A61L 2/08*  (2006.01)
*A61L 2/18*  (2006.01)
*A61L 9/00*  (2006.01)
*A01M 1/20*  (2006.01)

(52) U.S. Cl. ................ 422/26; 422/27; 422/28; 422/32; 422/36

(58) Field of Classification Search .................... 422/26, 422/27, 28, 32, 38, 36; 111/127; 141/85; 405/128.85, 128.6
See application file for complete search history.

(56) References Cited

U.S. PATENT DOCUMENTS
3,507,258 A * 4/1970 Smith ......................... 122/448.1
3,704,079 A   11/1972 Berlyn
(Continued)

FOREIGN PATENT DOCUMENTS
EP    1 479 287    11/2004
FR    2 862 349    5/2005
(Continued)

OTHER PUBLICATIONS
EP 1479287—English translation.*
(Continued)

*Primary Examiner* — Regina M. Yoo
(74) *Attorney, Agent, or Firm* — Young & Thompson

(57) ABSTRACT

Method of disinfecting floors by injecting hot, wet compressed air into the floor, this air being produced by a generator, whether on board or not, consisting of two cylinders of different diameters, one (1) of large diameter into which the atmospheric air is drawn and then compressed in a chamber (11) to a pressure and temperature sufficient to allow almost instantaneous vaporization of a dose of liquid and the other (6), facing the chamber, of smaller diameter in which the charge of humidified compressed air will be partly expanded so as to bring it back to the chosen pressure and temperature for use in order to inject it into the floor.

2 Claims, 3 Drawing Sheets

U.S. PATENT DOCUMENTS

Figure 1:
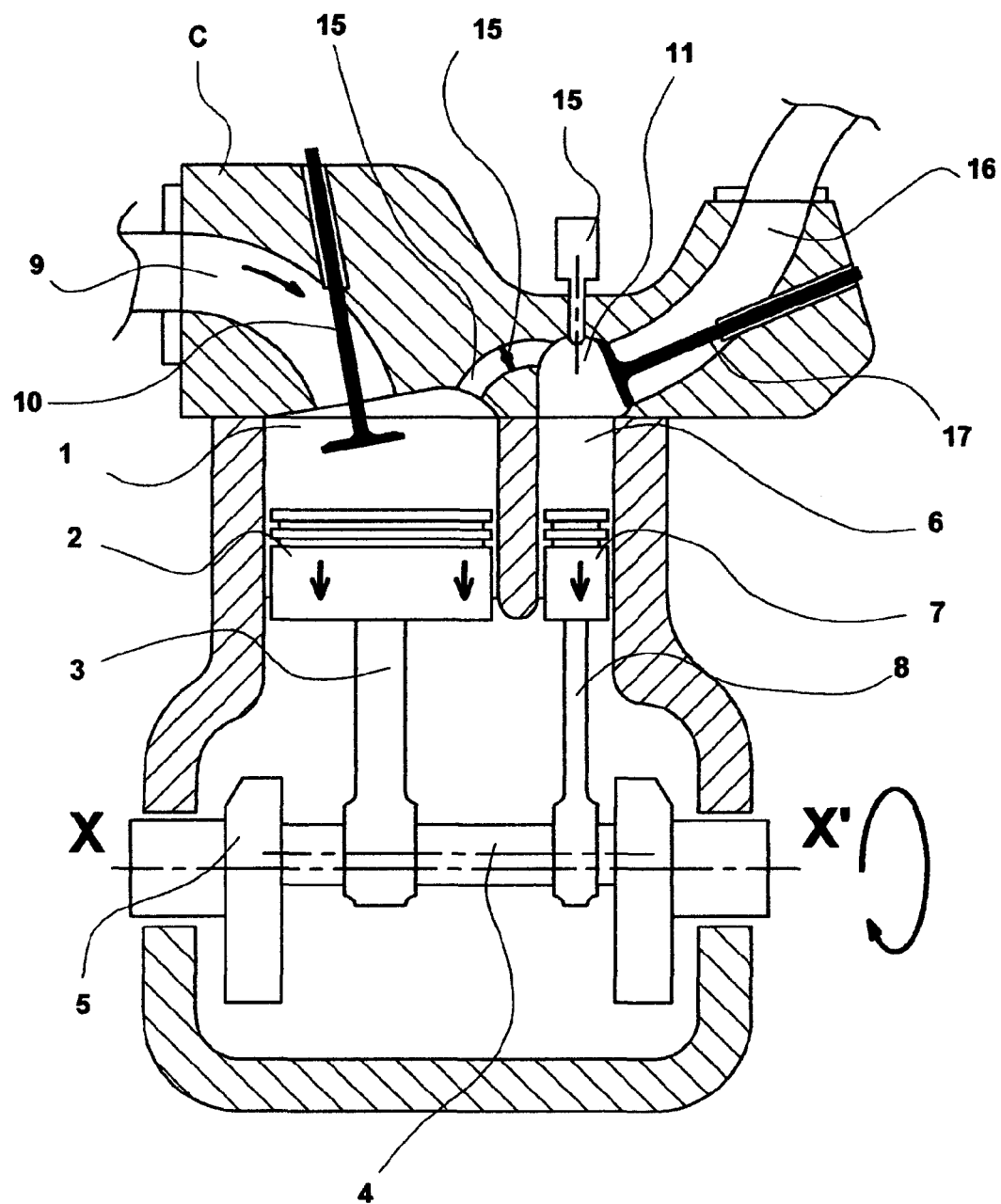

| | | | | |
|---|---|---|---|---|
| 4,646,782 | A | * | 3/1987 | Ezekoye .................... 137/527.8 |
| 5,050,340 | A | * | 9/1991 | Seifert ............................ 47/48.5 |
| 5,231,821 | A | * | 8/1993 | Firey ............................ 60/39.12 |
| 5,487,346 | A | * | 1/1996 | Taylor ............................ 111/127 |
| 5,803,022 | A | * | 9/1998 | Nelson et al. ............... 123/25 D |
| 5,946,851 | A | * | 9/1999 | Adey et al. ....................... 47/1.5 |
| 6,004,103 | A | * | 12/1999 | Fisher et al. ..................... 417/26 |
| 6,173,527 | B1 | * | 1/2001 | Pryor ......................... 47/58.1 R |
| 6,279,550 | B1 | * | 8/2001 | Bryant ....................... 123/559.1 |
| 6,647,204 | B1 | * | 11/2003 | Hutchinson ................... 392/491 |
| 2002/0003988 | A1 | * | 1/2002 | Mikus et al. ............. 405/128.35 |
| 2002/0056554 | A1 | * | 5/2002 | Hargreaves et al. ............ 172/21 |
| 2005/0143259 | A1 | * | 6/2005 | Newson ..................... 504/116.1 |
| 2006/0037567 | A1 | | 2/2006 | Thomas |
| 2007/0101712 | A1 | | 5/2007 | Negre et al. |
| 2007/0227418 | A1 | * | 10/2007 | Polfer ........................... 111/127 |

FOREIGN PATENT DOCUMENTS

WO          99/21418          5/1999

OTHER PUBLICATIONS

International Search report dated Dec. 7, 2008, from corresponding PCT application.

* cited by examiner

METHOD AND DEVICE FOR DISINFECTING GROUNDS BY GENERATING HUMIDIFIED HOT COMPRESSED AIR

The invention relates to a concept for disinfecting the ground and making it healthier.

It is known that pathological organisms such as nematodes, worms, fungi and bacterial pathogens contained in the soil cause considerable economic damage to crops.

Chemical pesticides and phytosanitary products, or, alternatively, methyl bromide, are currently used to disinfect the ground, these products being highly harmful and causing environmental pollution and contamination of the water table.

In order to remedy the disadvantages of these harmful products an U.S. Pat. No. 5,259,327, has proposed a device for injecting hot water into the ground, and likewise FR-A-2 383 601 discloses a manifold-less device with an on-board generator.

The use of hot water and/or steam entails considerable amounts of equipment; if the boiler is on-board, its size and power is limited because of its weight, and if the boiler is an external boiler then steam has to be transported over long distances through pipes thus losing a considerable amount of heat energy. Furthermore, boilers are energy-greedy and consume vast quantities of fuel.

Using this known technique, the temperature of the steam introduced into the ground needs to be more or less around 100° C. in order to destroy the pathological organisms without rendering the soil sterile.

VERDIVAP is the proprietor of a patent EP 1 479 287 A1, to the content of which reference may be made, which describes a device for disinfecting the ground comprising, in particular, a chassis intended to be moved over the ground, tines intended to penetrate the ground, an external steam generator connected to the chassis by pipes, this device being in the form of a trailed mobile trailer, giving good uniformity of diffusion.

The method of disinfecting the ground according to the invention proposes a lightweight and economical solution and is characterized by the means used taken both in their combination and separately, and most specifically.

This method and this device are defined in the attached claims.

The ground is thus disinfected by injecting into the ground humidified hot air produced by a generator, on-board or otherwise, in which the hot air is produced by compression in a positive-displacement machine, and the compressed hot air is humidified by injecting liquid into it.

The method according to the invention, counter to the teachings of the prior art, produces no steam from water that is heated or superheated, but uses ambient air, which is heated and then humidified.

The generator according to the invention has good flexibility to adapt it to the conditions of use, and in particular so that the outlet flow rate can be adjusted to some extent as can the absolute humidity of the air to suit the condition of the ground being treated and its moisture content.

As a preference, the generator according to the invention consists of two cylinders of different diameters, one being a large-diameter cylinder into which the atmospheric air is aspirated then compressed in a compression chamber to a high enough pressure and temperature that a dose of liquid can thereafter be vaporized almost instantly, and a smaller-diameter other cylinder, opposite said compression and vaporization chamber, and in which the charge of humidified compressed air will be partially expanded in order to bring it back down to the chosen service temperature and pressure.

To provide an entirely nonlimiting concrete example, by compressing the air in said chamber to a pressure of 21 bar, the temperature is raised to about 400° C. and the charge or amount of water introduced into the chamber will therefore be vaporized instantly. This charge is then partially expanded to 8 bar and returns approximately to the ideal temperature for disinfecting the ground, namely about 100° C.

The partial expansion produces work which offsets the amount of energy needed to drive the generator and considerably improves the efficiency of the machine.

In an alternative form of the invention, means for adjusting the outlet pressure and temperature of the generator, such as adjustable relief valves, are installed on the exhaust circuit of the machine, and the hot and humid compressed air produced by the generator is then injected into the ground at a temperature that is chosen to be high enough that it destroys pathological organisms but low enough that it does not sterilize the ground.

According to an alternative form of the invention, said compression and vaporization chamber is equipped with a positive-displacement device such as an adjustable piston so that its volume can be altered in order to be able to adjust the pressure and temperature reached at the end of compression.

An electronic device controls the flow rate of water to be vaporized on the basis of various parameters.

As a preference, the generator according to the invention uses the VERDIVAP mobile trailer according to EP 1 479 287 A1, but other means of injecting air into the ground, such as static plates, spiked harrows, spiked steaming grids, could be used without in any way altering the principle of the present invention.

The invention applies quite specifically to the disinfection of agricultural land to a deep depth and/or at the surface in order to obtain a herbicidal, fungicidal and nematicidal effect.

Figure 2:
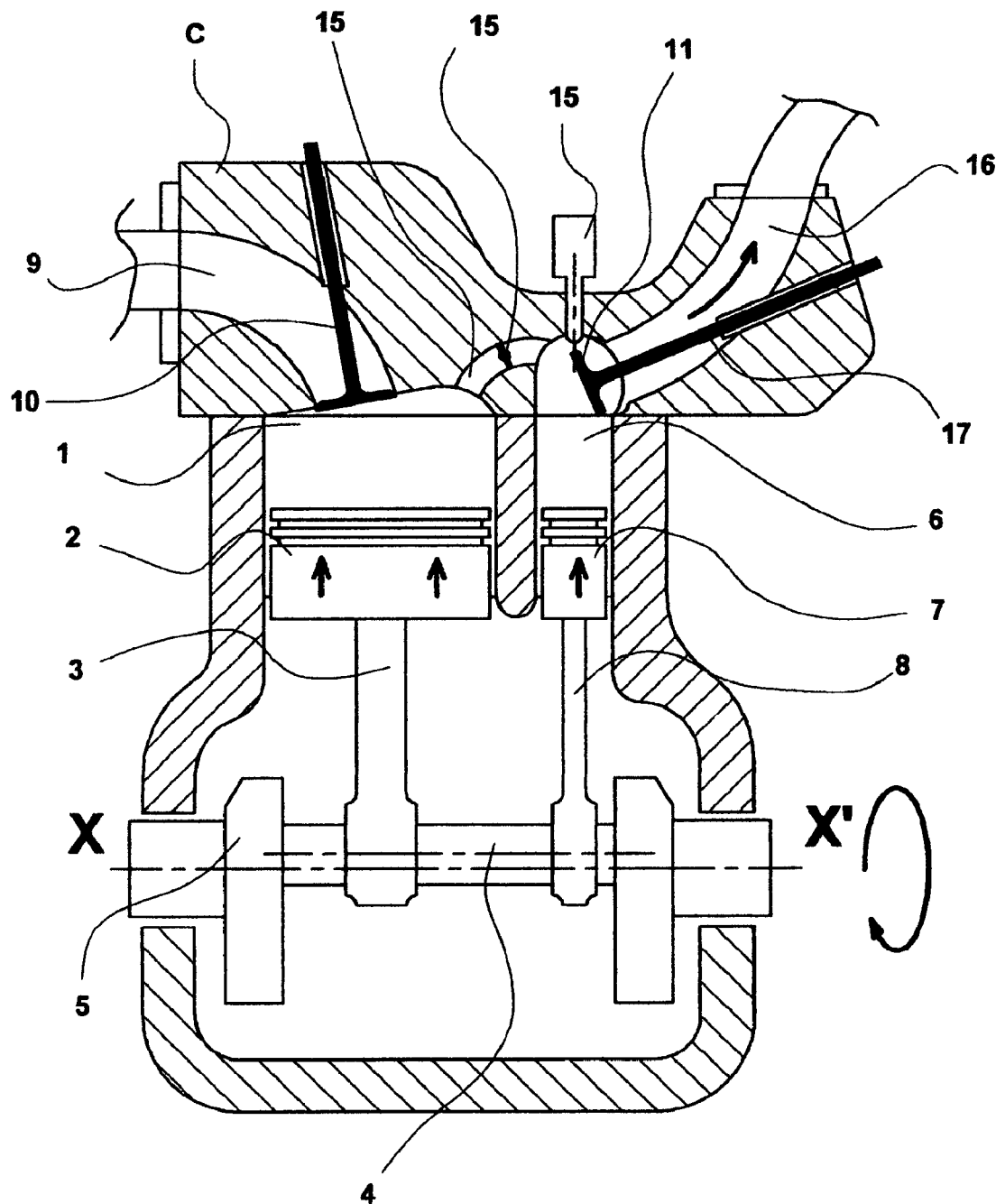
Figure 3:
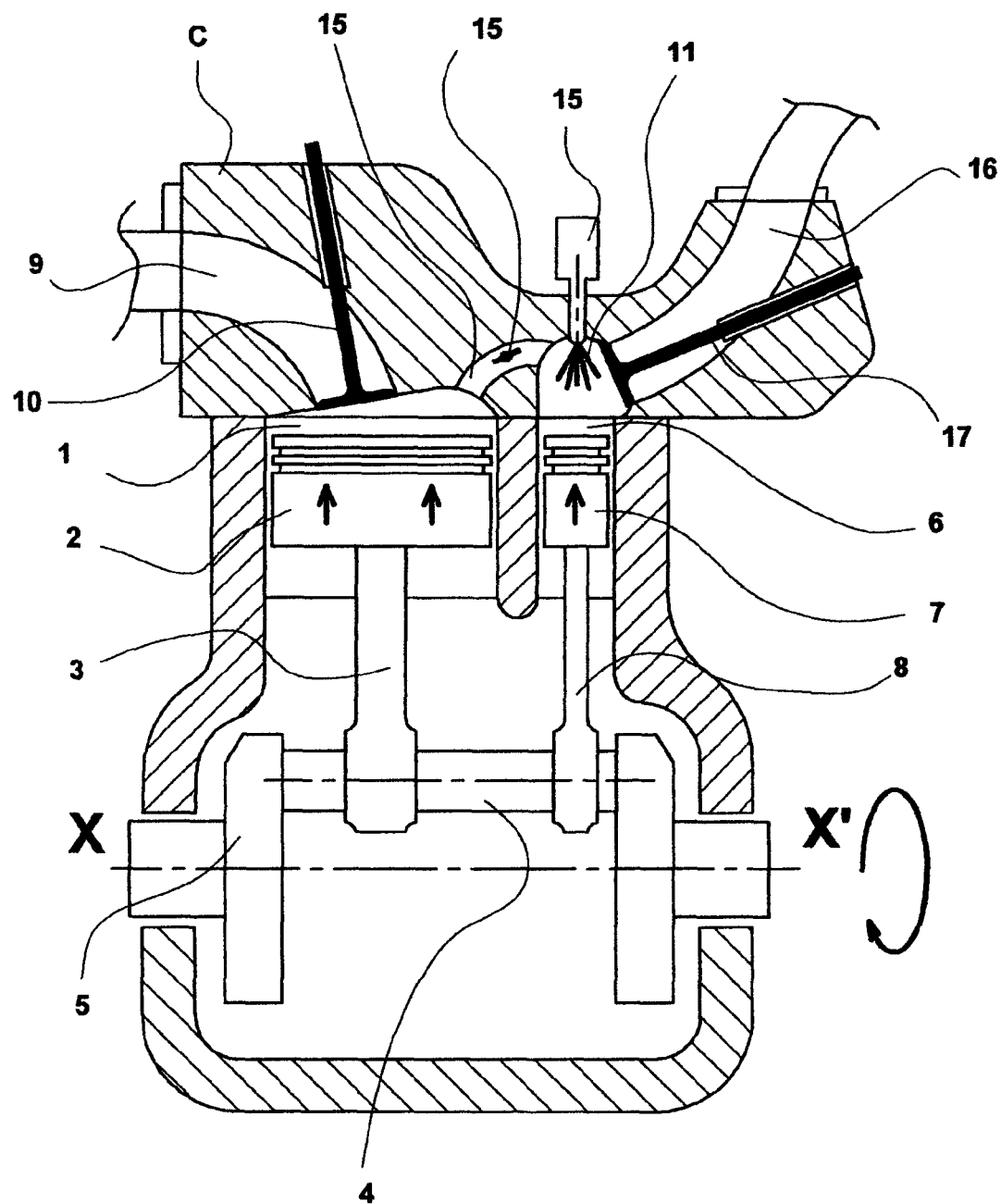

Other objects, advantages and features of the invention will become apparent from reading the entirely nonlimiting description of one embodiment given with reference to the drawings in which:

FIG. 1 depicts, viewed schematically in longitudinal section, one embodiment of the humid hot compressed air generator according to the invention, during its aspiration and partial expansion phase FIG. 2 depicts, viewed schematically in longitudinal section, the same generator in its phase of compressing and exhausting the humidified hot compressed air to the device that injects it into the ground FIG. 3 depicts, viewed schematically in longitudinal section, the generator according to the invention in the end of compression/start of water injection phase.

FIG. 1 depicts, viewed schematically in longitudinal section, one embodiment of the humid hot compressed air generator and shows the cylinder 1 used for the aspiration and compression of the atmospheric air, in which cylinder there slides a piston 2 connected by a connecting rod 3 to the crankpin 4 of a crankshaft 5 mounted to rotate on its axis XX' and the partial-expansion cylinder 6 in which there slides a piston 7 connected by a connecting rod 8 to the same crankpin 4 of the crankshaft 5 pivoting on its axis XX'. The two pistons 2 and 7 have their piston pins at the same level and operate in parallel with their top dead centers substantially in the same plane. Mounted over this moving assembly is a cylinder head C which comprises an atmospheric air inlet 9 controlled by a valve 10, and a chamber 11 facing the partial-expansion cylinder 6. Above the aspiration/compression cylinder, the plane of the cylinder head leaves a minimum amount of space with respect to the crown of the piston and this space is connected by a duct 13 controlled by a shutter 14. The chamber is fitted with a water injector 15 and with an exhaust duct 16 controlled by a valve 17.

The crankshaft 5 is rotationally driven by a motor, not depicted here, and via its crankpin 4 drives the pistons 2 and 7 which, in FIG. 1, have begun their down-stroke; the inlet valve 10 is therefore open and atmospheric air at ambient temperature is being aspirated into the cylinder 1. Having passed through bottom dead center, the pistons 2 and 7 begin their up-stroke—FIG. 2—and the piston 2 compresses the air admitted during the previous cycle into the chamber 11 through the duct 13, the shutter 14 having been opened and having placed the top of the piston 2 in communication with the chamber 11.

Appreciably before top dead center, FIG. 3, the shutter 14 is closed again and the electronically controlled water injector 15 injects into the chamber 11 a dose of water which, under the effect of the high temperature resulting from the compression, vaporizes instantly. When the pistons 2 and 7 have gone past top dead center, they begin a new down-stroke—FIG. 1—and the pressure of the humid air contained in the chamber 11 is partially reduced in the cylinder, driving the piston down and producing work; it should be noted that the diameter of the piston 7 is calculated such that the expansion of the charge in the chamber 11 to that pressure corresponds substantially to the chosen service pressure and temperature. Having moved through bottom dead center, the pistons 1 and 2 begin their up-stroke and the exhaust valve 17 is opened to allow the discharge of the compressed hot and humid air at the chosen service temperature, this air then being directed toward the equipment that is intended to inject it into the ground.

The abovementioned device uses a connecting rod/crank system that is commonplace in well-known piston engines; it is given by way of example and numerous positive-displacement systems may be used in order to obtain the same thermodynamic cycle and the same results without in any way changing the invention that has just been described.

The invention is not restricted to the exemplary embodiments described and depicted: the materials, control means, and devices described may vary within the limit of equivalents, to produce the same results, and the number of cylinders in the generator, the means of introducing the hot and humid compressed air into the ground can vary, without that in any way changing the invention that has just been described.

The invention claimed is:

1. A method of disinfecting ground, using a device in the form of a trailed mobile trailer having
    (a) a generator comprising a compression chamber (11) in which atmospheric air, having been aspirated and compressed by a piston (2), is raised to a pressure that will increase the air's temperature; into which chamber (11) water is then injected when the compressed air temperature is high enough to vaporize the amount of water injected; the compressed and humidified hot air then being partially expanded to drive back a piston (7) in a cylinder (6) so as to reach a service pressure and temperature, in order to obtain the compressed and humidified hot air ready to be discharged through an exhaust (16) and injected into the ground as the piston (7) rises back up,
    (b) a chassis configured to be placed on the ground and connected to the generator by pipes, and
    (c) tines configured to penetrate the ground and diffuse the compressed and humidified hot air,
the method using a thermodynamic cycle comprising the sequential steps of:
    aspiration of the atmospheric air;
    producing the compressed hot air by compressing the aspired atmospheric air to a higher temperature in a positive-displacement machine defined by the device;
    humidifying the compressed hot air thus produced by injecting water into the compressed hot air and vaporization of the injected water in the compressed hot air; and
    injecting the compressed hot air thus humidified into the ground by polytropic partial expansion with work to the service pressure and temperature with exhaustion and injection into the ground.

2. The method of disinfecting the ground as claimed in claim 1, further comprising the step of adjusting a flow rate of the water injected into the compressed hot air in order to adjust a moisture content of the humidified compressed hot air.

* * * * *

UNITED STATES PATENT AND TRADEMARK OFFICE
CERTIFICATE OF CORRECTION

PATENT NO.      : 8,372,337 B2                          Page 1 of 1
APPLICATION NO. : 12/305837
DATED           : February 12, 2013
INVENTOR(S)     : Negre et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

First Day of September, 2015

Michelle K. Lee
*Director of the United States Patent and Trademark Office*